US008892298B2

(12) United States Patent
Paturle et al.

(10) Patent No.: US 8,892,298 B2
(45) Date of Patent: Nov. 18, 2014

(54) METHOD OF DETECTING WEAR OF A TYRE

(71) Applicants: Antoine Paturle, Clermont-Ferrand (FR); Antoine Ducloux, Clermont-Ferrand (FR)

(72) Inventors: Antoine Paturle, Clermont-Ferrand (FR); Antoine Ducloux, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/349,897

(22) PCT Filed: Oct. 4, 2012

(86) PCT No.: PCT/FR2012/052249
§ 371 (c)(1),
(2), (4) Date: Apr. 4, 2014

(87) PCT Pub. No.: WO2013/050710
PCT Pub. Date: Apr. 11, 2013

(65) Prior Publication Data
US 2014/0277929 A1 Sep. 18, 2014

(30) Foreign Application Priority Data

Oct. 6, 2011 (FR) ...................................... 11 59048

(51) Int. Cl.
*B60C 11/24* (2006.01)
*B60C 11/03* (2006.01)
*G01M 17/02* (2006.01)

(52) U.S. Cl.
CPC ............... *B60C 11/246* (2013.04); *B60C 11/24* (2013.01); *B60C 11/243* (2013.04);
(Continued)

(58) Field of Classification Search
CPC .. B60C 11/24; B60C 11/0318; B60C 11/243; B60C 11/246; B60C 11/03; B60C 2019/006; B60C 2019/007; G01M 17/025; Y01S 152/00; Y01S 152/901

USPC .......... 701/32.8, 32.9, 34.4; 152/154.2; 73/8, 73/146; 340/425.5, 438
See application file for complete search history.

(56) References Cited

U.S. PATENT DOCUMENTS 4,266,428 A * 5/1981 Ho .................................. 73/146
4,275,589 A * 6/1981 Dugger et al. .................. 73/146
(Continued)

FOREIGN PATENT DOCUMENTS

FR 2 940 190 A1 6/2010
FR 2 954 224 A1 6/2011
(Continued)

OTHER PUBLICATIONS

Su I Do et al, Estimating Tire Condition Based on Wavelet Analysis and Frequency Modulation, IEEE International Conference on Control, Automation and Systems, 2007, pp. 2767-2771.*

*Primary Examiner* — Russell Frejd
(74) *Attorney, Agent, or Firm* — Fitzpatrick, Cella, Harper & Scinto

(57) ABSTRACT

A method for detecting a wear condition of a tire utilizes tread pattern elements included on the tire. The elements are adapted to generate first and second acoustic footprint noises (BEA1, BEA2), with one of the first and second acoustic footprint noises being characteristic of the wear condition of the tire. According to the method, a parent frequency spectrum, which is capable of forming a frequency spectrum of one of the first and second acoustic footprint noises, and a child frequency spectrum, which is capable of forming a frequency spectrum of the other of the first and second acoustic footprint noises, are selected from a frequency spectrum of an acoustic signal acquired from the tire. Two detection confidence indices are determined. If each detection confidence index meets a predetermined condition, a warning is emitted indicating that tire wear has been detected.

13 Claims, 4 Drawing Sheets

(52) U.S. Cl.
CPC ...... *B60C 11/0318* (2013.04); *B60C 2019/006* (2013.04); *B60C 11/03* (2013.01); *B60C 2019/007* (2013.04); *G01M 17/025* (2013.01)
USPC ..... 701/34.4; 701/32.8; 701/32.9; 152/154.2; 73/146; 340/438

(56) References Cited

U.S. PATENT DOCUMENTS

| | | | | |
|---|---|---|---|---|
| 4,365,514 | A | * | 12/1982 | Ho ................................... 73/592 |
| 5,421,389 | A | * | 6/1995 | Favre et al. .............. 152/209.28 |
| 5,753,057 | A | * | 5/1998 | Wesolowski ..................... 152/29 |
| 6,776,204 | B2 | * | 8/2004 | Cesarini et al. ............. 152/209.8 |
| 8,731,767 | B2 | | 5/2014 | Paturle ......................... 701/31.4 |
| 2002/0000278 | A1 | * | 1/2002 | Cesarini et al. .......... 152/209.25 |
| 2004/0154715 | A1 | * | 8/2004 | Dufournier ................. 152/154.2 |
| 2011/0252862 | A1 | | 10/2011 | Paturle ................................ 73/8 |
| 2011/0259490 | A1 | | 10/2011 | Paturle ....................... 152/154.2 |
| 2012/0010776 | A1 | | 1/2012 | Paturle ......................... 701/31.5 |
| 2012/0266649 | A1 | | 10/2012 | Paturle et al. ....................... 73/8 |
| 2012/0266650 | A1 | | 10/2012 | Paturle ................................ 73/8 |
| 2012/0273102 | A1 | | 11/2012 | Paturle ....................... 152/154.2 |
| 2014/0121997 | A1 | | 5/2014 | Paturle ............................ 702/34 |
| 2014/0124108 | A1 | | 5/2014 | Paturle ....................... 152/154.2 |
| 2014/0130948 | A1 | | 5/2014 | Paturle ....................... 152/154.2 |

FOREIGN PATENT DOCUMENTS

| | | |
|---|---|---|
| WO | WO 2010/106297 A1 | 9/2010 |
| WO | WO 2011/067535 A1 | 6/2011 |

* cited by examiner

METHOD OF DETECTING WEAR OF A TYRE

FIELD OF THE INVENTION

The present invention relates to a method of detecting wear of a tyre. It is applicable, notably, but not exclusively, to tyres for road vehicles of all types, including passenger vehicles and heavy goods vehicles.

RELATED ART

A method of detecting wear of a tyre is known from the document WO 2011/067535. The tyre includes a plurality of acoustic wear indicators equally distributed circumferentially around the tyre and emitting, above a predetermined radial wear threshold, an acoustic footprint noise whose frequency spectrum includes a plurality of elementary frequency components forming a Dirac comb. The elementary frequency components of this comb are equally distributed in frequency; that is to say, the components of each pair of adjacent components forming the comb are spaced apart from each other in frequency by a substantially constant frequency difference.

In the course of this method, an acoustic signal is acquired and the frequency spectrum of this signal is determined. The resulting spectrum comprises elementary frequency components, some of which may form the Dirac comb of the acoustic footprint noise spectrum. A search is therefore made to discover whether this Dirac comb is present in the spectrum of the acoustic signal.

For this purpose, a list is made of a plurality of spectra of elementary frequency components whose components form Dirac combs. For each spectrum listed, different indices are then calculated, making it possible to select, from among all the listed spectra, the spectrum which is most likely to form the desired Dirac comb.

Finally, a confidence index of the selected spectrum is determined. If this confidence index is above a predetermined threshold, a tyre wear warning is sent.

However, in certain conditions, notably in specific conditions of speed and road surface condition, a warning is emitted incorrectly. In particular, it is found that the spectrum selected by the prior art method is not that of the Dirac comb generated by the wear indicators.

BRIEF DESCRIPTION OF EMBODIMENTS OF THE INVENTION

The object of the invention is to provide more reliable detection of tyre wear.

For this purpose, the invention proposes a method of detecting the wear of a tyre, the tyre comprising at least a first tread pattern element adapted to generate a first acoustic footprint noise and at least a second tread pattern element adapted to generate a second acoustic footprint noise characteristic of the wear of the tyre, in which method:

an acoustic signal capable of comprising the first and second acoustic footprint noises is acquired, within the frequency spectrum of the acquired acoustic signal, a frequency spectrum, called the parent spectrum, is selected, this spectrum being capable of forming the frequency spectrum of one of the first and second acoustic footprint noises, a frequency spectrum called a trimmed spectrum is determined by eliminating at least part of the parent spectrum from the spectrum of the acoustic signal, within the trimmed spectrum, a frequency spectrum, called the child spectrum, is selected, this spectrum being capable of forming the frequency spectrum of the other of the first and second acoustic footprint noises, two confidence indices, called detection confidence indices, are determined, these indices being associated with the detection of the first and second acoustic footprint noises based on at least one characteristic of each selected parent and child spectrum, if each detection confidence index meets a predetermined condition relating to the detection of each first and second acoustic footprint noise, a warning of the detection of tyre wear is emitted.

The inventors who have originated the invention have fortuitously discovered that the spectrum selected by the prior art method does not correspond to the spectrum generated by the tread pattern elements generating the characteristic tyre wear noise, a Dirac comb in the case of circumferentially equally distributed acoustic wear indicators, but actually corresponds to a spectrum generated by other tread pattern elements of the tyre.

This is because the tread of a tyre for a passenger vehicle comprises circumferential portions distributed circumferentially around the axis of revolution of the tyre. Each circumferential portion carries a pattern chosen from among a group of several different patterns, generally three or four patterns. This tread is called a multi-pitch tread. Even if it does not comprise a periodic pattern, the tread itself forms a periodic pattern which is repeated on each revolution of the tyre, thus generating an acoustic footprint noise whose frequency spectrum forms a Dirac comb.

By contrast with a tyre for a passenger vehicle, the circumferential portions of a tyre for a heavy goods vehicle are all identical. The tread is called a mono-pitch tread. If the tread includes N circumferential portions, each portion is therefore repeated N times on each revolution of the tyre, thus also generating an acoustic footprint noise whose frequency spectrum forms a Dirac comb.

Thus, if the tyre has first tread pattern elements forming N1 pattern(s) repeating on each revolution of the wheel, and second tread pattern elements forming N2 circumferentially equally distributed acoustic wear indicators, the frequency spectrum of the acoustic signal comprises two Dirac combs whose pairs of adjacent elementary frequency components are separated, respectively, by a frequency difference $DP1=N1*V/C$ (for the comb called the "tyre" comb generated by the first tread pattern elements) and $DP2=N2*V/C$ (for the comb called the "indicator" comb generated by the second tread pattern elements), where V is the speed of the vehicle and C is the circumference of the tyre.

FIG. 1 shows a theoretical frequency spectrum of the acoustic signal generated by a tyre for a passenger vehicle comprising N2 circumferentially equally distributed acoustic wear indicators. The theoretical frequency spectrum comprises elementary frequency components whose spectral power density is shown as a function of the frequency. The theoretical frequency spectrum comprises the "tyre" comb (in fine lines) and the "indicator" comb (in heavy lines). Thus, in the case of a tyre for a passenger vehicle in which $N1=1$, the frequency difference DP2 of the "indicator" comb is a multiple of the frequency difference DP1 of the "tyre" comb; that is to say, $DP2=N2.DP1$. The spectral density of the components of each comb is substantially equal, so that the components of the "indicator" comb are added to the components of the "tyre" comb, and therefore have a spectral power density twice as great as that of the components of the "tyre" comb. In this case, the spectrum generated by the second tread pattern elements usually forms the parent spectrum, because the spectral density of its components is greater, making this spectrum easier to detect. The child spectrum usually forms the spectrum generated by the first tread pattern elements.

FIG. 2 shows a theoretical frequency spectrum of the acoustic signal generated by a tyre for a heavy goods vehicle comprising first tread pattern elements forming N1 circumferentially equally distributed tread patterns and second tread pattern elements forming N2 circumferentially equally distributed acoustic wear indicators. The theoretical frequency spectrum comprises the "tyre" comb (in heavy lines) and the "indicator" comb (in fine lines). Thus, in the case of a tyre for a heavy goods vehicle in which N1>N2, the frequency difference DP2 of the "indicator" comb is a submultiple of the frequency difference DP1 of the "tyre" comb; that is to say, DP2=N2/N1.DP1. The spectral density of the components of the "tyre" comb is greater than that of the components of the "indicator" comb, so that the components of the "tyre" comb are added to the components of the "indicator" comb, and therefore have a spectral power density considerably greater than that of the components of the "indicator" comb. In this case, the spectrum generated by the first tread pattern elements is usually the parent spectrum, because the spectral density of its components is greater, making this spectrum easier to detect. The child spectrum is usually the spectrum generated by the second tread pattern elements which generate the characteristic noise of wear.

The inventors who have originated the invention have made use of the superimposition of the two acoustic footprint noises to improve the reliability of the detection of the tyre wear. In fact, in the method according to the invention, both spectra have to be detected in order to trigger the warning of the detection of the tyre wear.

Additionally, the invention makes it possible to avoid the detection of a false child spectrum based on the parent spectrum. A false child spectrum of this type is, for example, a comb comprising a plurality of elementary frequency components spaced apart equally in frequency among the elementary frequency components of a denser parent spectrum. In the method according to the invention, the step of partial elimination of the parent spectrum makes it possible to retain only the child spectrum, and therefore to avoid detecting a false child spectrum which might be constructed on the basis of components of the parent spectrum.

The method makes it possible, more particularly, to improve the detection of the wear of tyres of a vehicle by means of a single microphone. This is because, in the case of a vehicle comprising a front and a rear axle, the tyres of the front axle become worn more or less rapidly than the tyres of the rear axle, depending on whether the vehicle is of the traction, propulsion, or four-wheel drive type. Depending on the position of the microphone, the captured intensities of the noises generated by the tyres of the front and rear axles differ to such an extent that the microphone can capture, depending on the type of vehicle, an acoustic footprint noise characteristic of the wear which has an intensity much higher or lower than the intensity of the acoustic footprint noise generated by the tread patterns of the other tyres. The method according to the invention makes it possible to benefit from the detection of the parent spectrum of the acoustic footprint noise having the greatest intensity in order to detect the child spectrum of the other acoustic footprint noise and to confirm or invalidate the detection of the wear of the tyre.

Preferably, the parent spectrum comprising elementary frequency components, the elementary frequency components of the parent spectrum having a spectral power density above a predetermined threshold are retained.

Thus the elementary frequency components of the parent spectrum that also form the elementary frequency components of the child spectrum that is to be identified and selected are retained.

Preferably, the second tread pattern elements comprise at least one, and preferably more than one, acoustic wear indicators equally distributed circumferentially over the tyre.

According to an optional characteristic of the method, at least one frequency spectrum, called the hypothetical spectrum, is listed, and at least one frequency characteristic of each hypothetical spectrum is determined.

Preferably, for each hypothetical spectrum, a confidence index, called the selection index, is determined, this index being associated with the selection of the hypothetical spectrum.

The selection confidence index can be used to classify the listed hypothetical spectra. Thus, by an appropriate choice of the selection confidence index, it is possible to select the hypothetical series most capable of forming the frequency spectra of the first and second acoustic footprint noises.

Advantageously, each hypothetical spectrum comprising elementary frequency components, the frequency characteristic of the hypothetical spectrum is the frequency difference separating each frequency component, in frequency, of each hypothetical spectrum from at least one adjacent frequency component of the hypothetical spectrum.

In the case of wear indicators that are equally distributed circumferentially, the frequency difference facilitates the identification of the spectra capable of forming the Dirac combs of the first and second acoustic footprint noises. In the case of wear indicators that are distributed differently, a frequency characteristic representative of this distribution is defined.

Preferably, the selection of the child spectrum is limited to the hypothetical spectra whose frequency difference lies within a range of frequency differences determined on the basis of the frequency difference of the parent spectrum.

Thus, the step of selecting the child spectrum is restricted to a range of frequency differences comprising the theoretical frequency difference of the child spectrum. This increases the rapidity of the method. If the parent spectrum is the spectrum of the acoustic footprint noise generated by the first tread pattern elements, the range of frequency differences is limited to the differences of the theoretical spectra of the acoustic footprint noise generated by the second tread pattern elements. Conversely, if the parent spectrum is the spectrum of the acoustic footprint noise generated by the second tread pattern elements, the range of frequency differences is limited to the differences of the theoretical spectra of the acoustic footprint noise generated by the first tread pattern elements.

Optionally, first and second frequency spectra, called potential spectra, are selected within the frequency spectrum of the acquired acoustic signal, each potential frequency spectrum being capable of forming the frequency spectrum of one of the acoustic footprint noises, and the parent spectrum is selected from among the first and second potential frequency spectra.

The step of selecting potential spectra can improve the robustness and rapidity of the detection method.

Preferably, the first potential spectrum is selected from among the hypothetical spectra having a frequency difference belonging to a predetermined first range of frequency differences, and the second potential spectrum is selected from among the hypothetical spectra having a frequency difference belonging to a second predetermined range of frequency differences, which is different from the first range.

The ranges of frequency differences comprise the theoretical frequency differences capable of separating the elementary frequency components of the spectra of the acoustic footprint noises emitted by the first and second tread pattern elements. Thus the frequency differences which cannot form the theoretical frequency differences are disregarded. This increases the rapidity of the detection method.

The ranges of frequency differences are determined with allowance for the extreme values of the parameters that it is not necessarily desirable to know. Thus, for a tyre for a passenger vehicle whose speed varies from 30 to 130 km/hr, the number of indicators varies from 2 to 8, the circumference varies from 1.60 m to 2.5 m, the frequency difference of the Dirac comb of the first acoustic footprint noise emitted by the first tread pattern elements belongs to the range from 3.3 Hz to 22.6 Hz, and the frequency difference of the Dirac comb of the second acoustic footprint noise emitted by the second tread pattern elements belongs to the range from 6.6 Hz to 180.5 Hz. For a tyre for a heavy goods vehicle whose speed varies from 30 to 100 km/hr, the number of patterns repeating on each wheel revolution varies from 45 to 55, the number of indicators varies from 1 to 12, the circumference varies from 2.5 m to 3.5 m, the frequency difference of the Dirac comb of the acoustic footprint noise emitted by the first tread pattern elements belongs to the range from 107.1 Hz to 611.1 Hz, and the frequency difference of the Dirac comb of the acoustic footprint noise emitted by the second tread pattern elements belongs to the range from 2.4 Hz to 133.3 Hz.

The invention also proposes a computer program comprising coded instructions adapted to command the execution of the steps of the method as defined above when it is run on a computer.

The invention also relates to a data recording medium comprising, in recorded form, a program as defined above.

The invention also proposes a method of providing a program as defined above on a telecommunications network for downloading.

BRIEF DESCRIPTION OF THE DRAWINGS

The invention will be more clearly understood from the following description which is provided solely by way of non-limiting example, and which refers to the drawings, in which.

DETAILED DESCRIPTION OF EMBODIMENTS OF THE INVENTION

Figure 1:
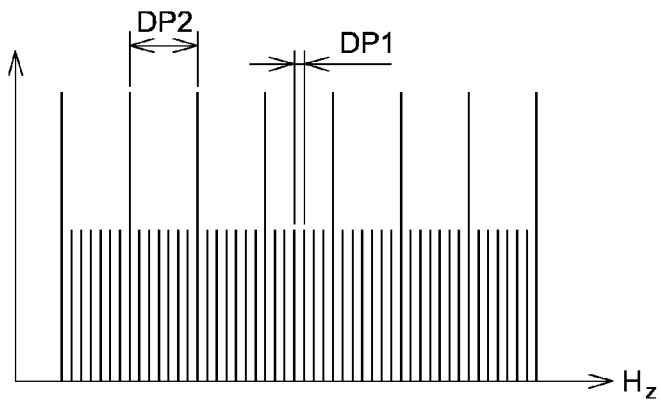
FIG. 1 shows a theoretical frequency spectrum of an acoustic signal generated by a tyre for a passenger vehicle.
Figure 2:
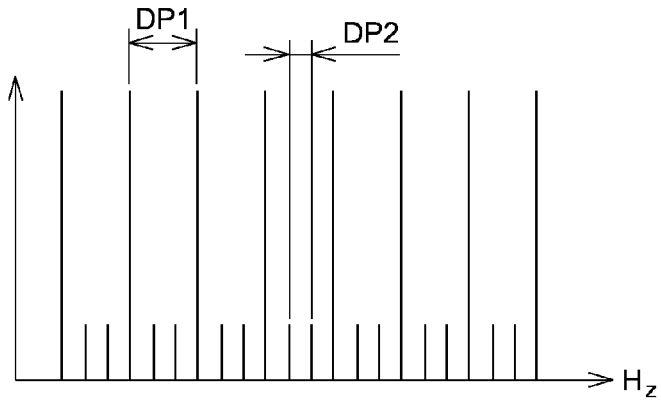
FIG. 2 shows a theoretical frequency spectrum of an acoustic signal generated by a tyre for a heavy goods vehicle.
Figure 3:
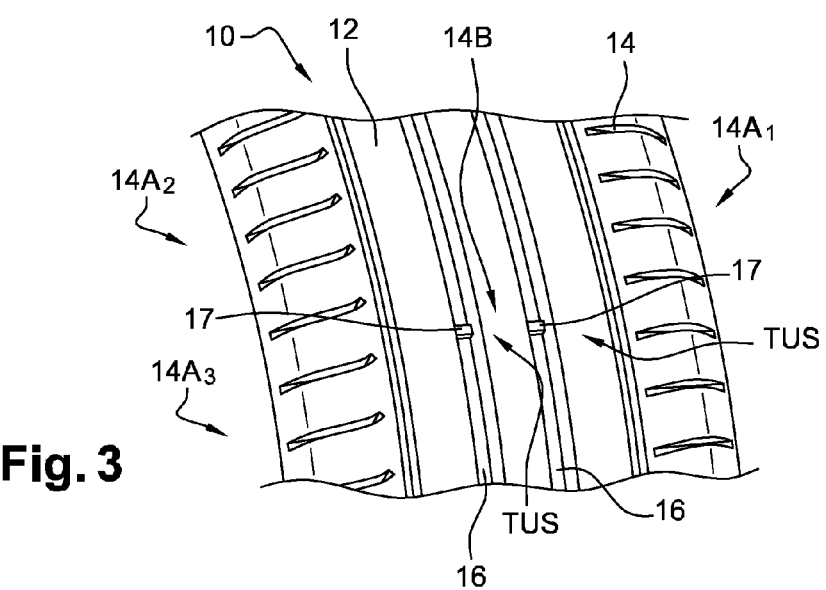
FIG. 3 shows a tread of a new tyre for passenger vehicle.

FIG. 3 shows a tyre in the new state, indicated by the general reference 10. The tyre 10 is intended for a passenger vehicle. The tyre 10 is substantially a solid of revolution about an axis.

The tyre 10 comprises a tread 12 of substantially toroidal shape 12 whose outer surface has tread patterns 14. The tread patterns comprise first and second tread pattern elements 14A, 14B.

The first tread pattern elements 14A comprise circumferential portions $14A_1$, $14A_2$, $14A_3$, . . . , $14A_{75}$, numbering seventy-five in this case, distributed circumferentially around the axis of revolution. Each portion $14A_i$ carries a pattern chosen from among a group of several different patterns, generally three or four patterns. The first elements 14A comprise two parallel circumferential grooves 16, cut into the surface of the tyre, with a predetermined depth H when the tyre 10 is new. Thus each portion $14A_i$ comprises a circumferential portion of each groove 16. The depth H of these grooves 16 is about 8 mm and their width is about 10 mm. The first elements 14A therefore form N1=1 tread patterns, repeating on each revolution of the tyre 10, and are adapted to generate a first acoustic footprint noise BEA1, regardless of the wear of the tyre 10.

The second tread pattern elements 14B comprise acoustic wear indicators TUS indicating a wear threshold SS. The depth of each groove 16 when the threshold SS is reached is fixed at 2.2 mm, corresponding to a threshold SS of 5.8 mm. Each acoustic wear indicator TUS is formed by a rubber projection 17 placed transversely on the bottom of the groove 16 in which it is located and extending radially from the bottom of this groove 16. When the tyre is new, each projection 17 has a predetermined height $h_S$ substantially equal to the difference between the depth H of the grooves 16 and the threshold SS. The tyre 10 has N2=6 sets, each comprising two projections 17. Thus the tyre 10 comprises twelve projections 17. Each projection 17 of each set is substantially aligned axially with each other projection 17 of the set. The projections 17 are equally distributed circumferentially on the tyre 10. Thus, above the threshold SS, when the tyre rotates, the projections 17 come into contact with the ground at constant time intervals if the tyre rolls at a substantially constant speed. The second elements 14B are adapted to generate a second acoustic footprint noise BEA2 above the wear threshold SS. This second acoustic footprint noise BEA2 is therefore characteristic of the wear of the tyre 10.

The projections 17 are arranged in such a way that, regardless of the radial wear of the tyre 10, two circumferentially successive projections 17 of a single groove 16 and the groove 16 itself delimit a space open to the air during the passage through the footprint area of the tyre 10 on the ground. In the present case, the distance between two circumferentially successive projections 17 of a single groove 16 is greater than a predetermined distance, in this case the length of the footprint area, so that, even above a threshold SS, the projections 17 and the groove 16 form a space which remains open to the air during their passage through the footprint area of the tyre 10 on the ground.

The tread patterns 14 also comprise legal wear indicators (not shown) indicating a legal wear threshold. The legal wear threshold is reached after the threshold SS.

When the tyre 10 is new, as shown in FIG. 3, the height of the projections 17 is less than the depth of the grooves 16, and therefore each indicator TUS comprises a space located above the projections 17, that is to say at the top of the projections 17. Thus, when the tyre 10 is new, the second elements 14B cannot come into contact with the ground during their passage through the footprint area of the tyre 10 on the ground, and therefore cannot generate the second acoustic footprint noise BEA2.

Figure 4:
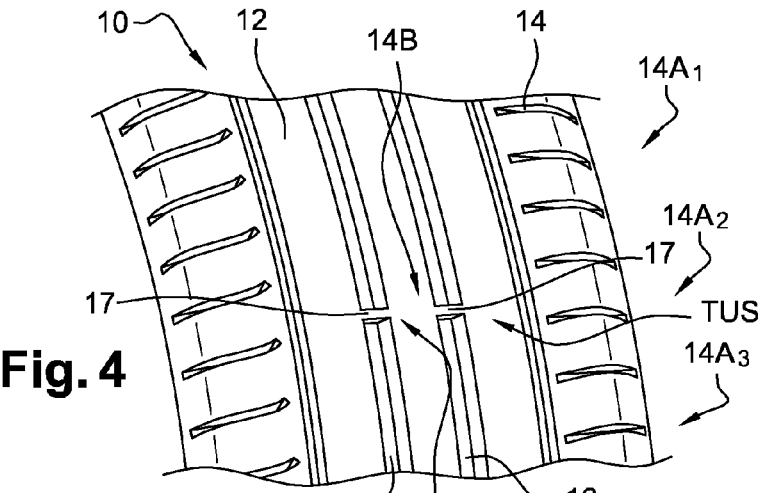
FIG. 4 shows a tread of a tyre of FIG. 1 worn above a wear threshold and comprising first and second tread pattern elements adapted to generate, respectively, first and second acoustic footprint noises.

FIG. 4 shows the tyre 10 of FIG. 3 worn above the threshold SS.

The wear of the tread 12 of the tyre 10 shown in FIG. 4 is 6 mm, that is to say above the threshold SS, or in other words greater than the distance which, when the tyre 10 is new, separates the projections 17 from the surface of the tread 12. Because of the wear that exceeds SS, the tops of the projections 17 are at the same level as the surface of the tread 12. Above the threshold SS, each projection 17 has a height which is lower than the height $h_S$. In the present case, the height is 2.2 mm lower, and is equal to 2 mm for a wear of 6 mm. This height is equal to the difference between the depth of each groove 16 and the wear of the tyre 10. When the tyre 10 is worn above the threshold SS, each projection 17 is arranged so as to come into contact with the ground during its passage through the footprint area of the tyre 10 on the ground. It then emits a sound. This succession of contacts between the projections 17 and the ground gives rise to the second acoustic footprint noise BEA2.

In a variant, the tyre 10 comprises second elements 14B which are different from the projections 17. The second elements form acoustic wear indicators above a predetermined wear threshold. They may be acoustic cavities as described in the published document WO 2011/067535.

The principle of the detection of the acoustic footprint noises BEA1, BEA2 is similar to the principle of the detection of the acoustic footprint noise described in WO 2011/067535 applied to the compression and relaxation of the air trapped in an acoustic cavity. Thus, the detection of the first acoustic footprint noise BEA1 generated by the first tread pattern elements 14A forming N1=1 pattern repeating with the revolution of the wheel (in the case of the tyre for a passenger vehicle) or N1 circumferentially equally distributed patterns (in the case of the tyre for a heavy goods vehicle) is based on the same principle as the detection of an acoustic footprint noise generated by N1=1 set of one or more acoustic cavities. The detection of the second acoustic footprint noise BEA2 generated by N2 sets of indicators TUS equally distributed circumferentially over the tyre 10 is based on the same principle as the detection of an acoustic footprint noise generated by N2 sets of one or more acoustic footprint cavities equally distributed circumferentially over the tyre 10.

Figure 5:
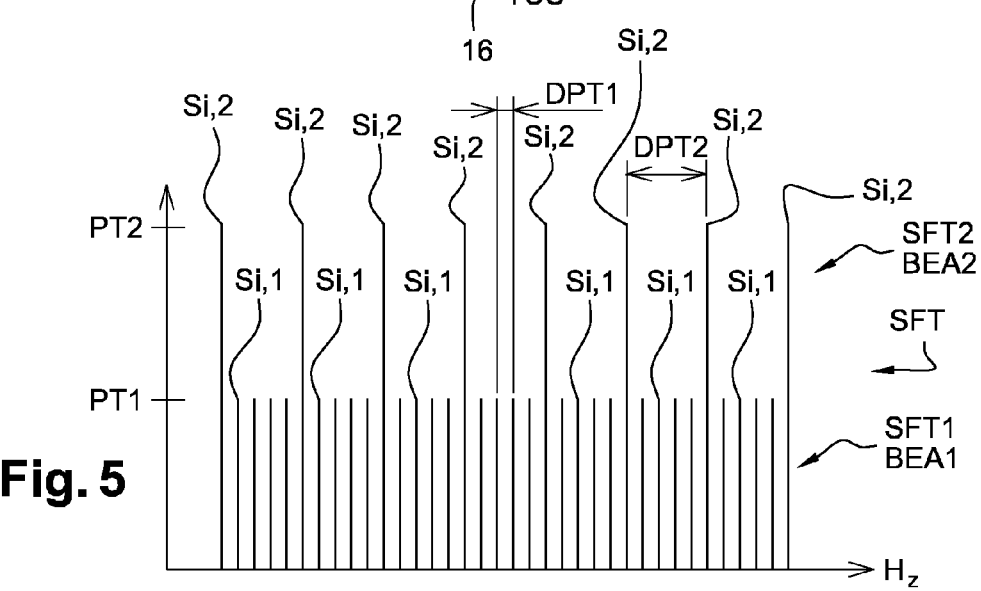
FIG. 5 shows a theoretical frequency spectrum of a theoretical acoustic signal generated by the tyre of FIG. 4.

The spectral power density of a theoretical frequency spectrum SFT is shown in FIG. 5 as a function of the frequency. The spectrum SFT is obtained by processing a theoretical acoustic signal emitted by the tyre 10 when it is worn above the threshold SS, the tyre having a circumference C=1.93 m and being mounted on the rear axle of a vehicle travelling at V=90 km·h$^{-1}$=25 m·s$^{-1}$.

The theoretical frequency signal SFT comprises first and second theoretical frequency spectra SFT1, SFT2 of the first and second acoustic footprints BEA1, BEA2 respectively. Each spectrum SFT1, SFT2 forms a Dirac comb and comprises, respectively, elementary frequency components Si,1, Si,2, the pairs of adjacent components being equidistant in frequency. In fact, each actual spectrum SF1, SF2 takes the form of a Dirac comb which has lost some of its teeth, that is to say one from which a plurality of elementary frequency components are absent. Additionally, the elementary frequency components have unequal spectral power densities.

Two adjacent elementary frequency components Si,1 (shown in fine lines) are separated from each other by a theoretical frequency difference DPT1=N1*V/C=12.9 Hz. Similarly, two adjacent elementary frequency components Si,2 (shown in heavy lines) are separated from each other by a theoretical frequency difference DPT2=N2*V/C=77.4 Hz.

Each component Si,1, Si,2 has a theoretical spectral power density equal to PT1, PT2 respectively. In the theoretical case represented in FIG. 5, PT1=PT2.

We will now describe a method of detecting the wear of a tyre, with reference to FIGS. 6 to 14.

Figure 6:
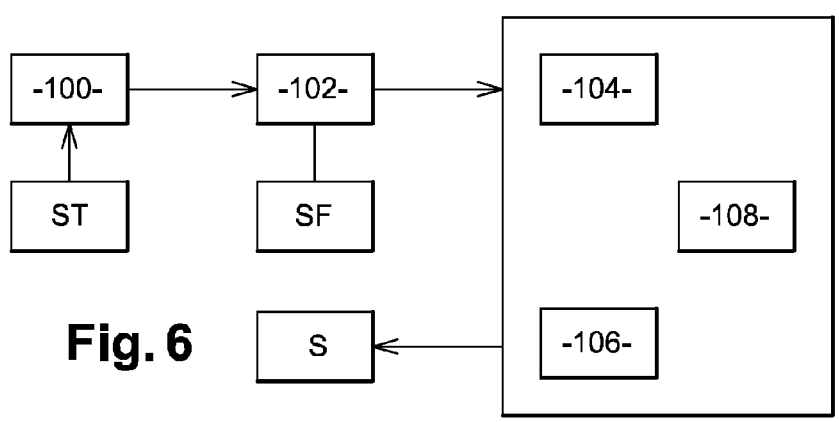
FIG. 6 is a flow diagram showing steps for processing the acoustic signal for the purpose of obtaining the theoretical frequency spectrum of FIG. 5.

FIG. 6 shows a flow diagram of steps for processing the acoustic signal for the purpose of obtaining the frequency spectrum of FIG. 5.

In step 100, a time-dependent acoustic signal ST capable of comprising the first and second acoustic footprint noises BEA1, BEA2 is acquired. The acoustic signal ST is obtained by recording the noise generated by two tyres 10 worn above the threshold SS, tyres having a circumference C=1.93 m and being mounted on the rear axle of a vehicle travelling at V=90 km·h$^{-1}$=25 m·s$^{-1}$. The duration of the acquisition frame is T=1 s, and the sampling frequency is Fe=16,384 Hz.

Figure 7:
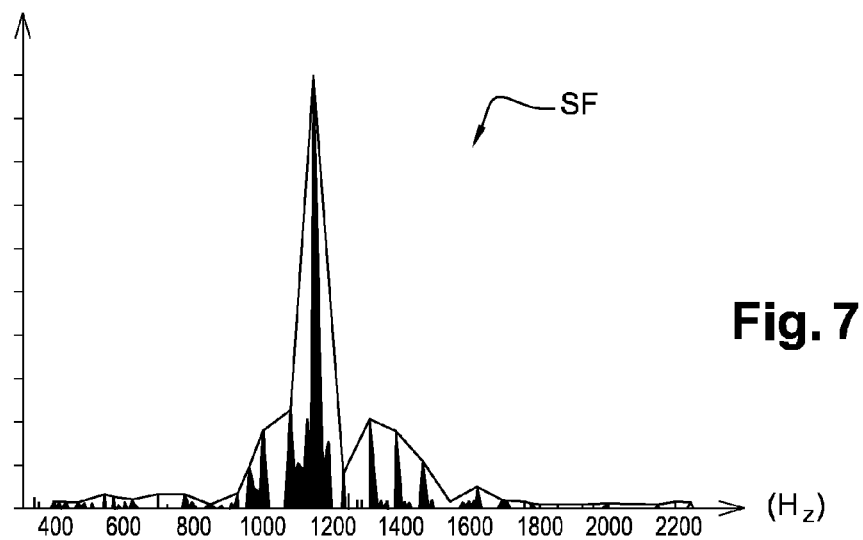
FIG. 7 is an actual frequency spectrum of an actual acoustic signal generated by the tyre of FIG. 4.

In step 102, a Fourier transform is applied to the time-dependent signal ST in order to obtain a frequency spectrum SF, shown in FIG. 7. While it is capable of comprising the first and second frequency spectra SF1, SF2 of the first and second acoustic footprint noises BEA1, BEA2 respectively, the frequency spectrum SF, unlike the theoretical frequency spectrum SFT of FIG. 5, comprises numerous elementary frequency components produced by parasitic noises such as the wind, the engine noise, or the noise of the transmission system associated therewith. The aim of the method is, notably, to determine whether the spectrum SF comprises the spectra SF1, SF2, preferably in the absence of any knowledge of the characteristics of the tyre 10 such as the number N2 of indicators, the circumference C of the tyre 10, and the speed V of the vehicle.

In the following steps 104 to 108, spectral pre-processing of the frequency spectrum SF of FIG. 7 is carried out. In step 104, a frequency domain Df of the frequency spectrum SF in the range from 500 to 2500 Hz, in this case from 1000 to 2000 Hz, is isolated. Then, in step 106, the noise is eliminated, and the spectrum SF is optionally normalized in the frequency domain Df. Finally, in step 108, the elementary frequency components of the filtered spectrum having an intensity above a predetermined intensity threshold are isolated.

Thus a frequency spectrum S comprising a plurality of elementary frequency components is obtained. The spectrum S is therefore obtained by processing the time-dependent acoustic signal ST. In a variant, the pre-processing steps may be omitted, or other supplementary processing steps may be performed.

Figure 8:
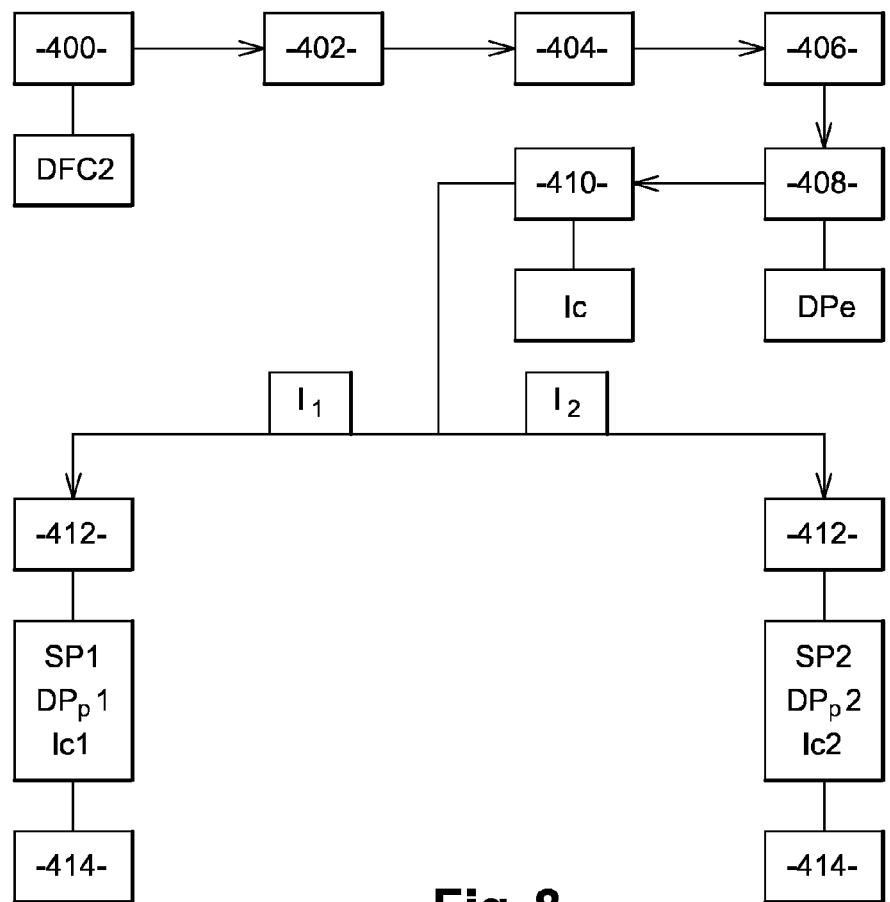
FIG. 8 is a flow diagram of steps for listing hypothetical frequency spectra and selecting first and second potential frequency spectra.

A description will now be given, with reference to FIG. 8, of steps 400 to 410 for the listing of at least one frequency spectrum SH, called a hypothetical spectrum of elementary frequency components Si, on the basis of the elementary frequency components Si of the spectrum S.

Initially, the first and second ranges I1, I2 of frequency differences DP are determined in such a way that each range I1, I2 comprises, respectively, the frequency difference DP1 of the desired spectrum SF1 and the frequency difference DP2 of the desired spectrum SF2. In the present case, given that the speed V of the vehicle can vary from 30 to 130 km·h$^{-1}$, that the number N1 of macro-patterns is included in the range [N1,min; N1, max] (in this case N1, min=1 and N1, max=1), that the number N2 of indicators TUS is included in the range [N2,min; N2,max] (in this case N2,min=2 and N2,max=8), and that the circumference C can vary from 1.6 to 2.5 m, each range I1, I2 is such that I1=[3.3 Hz, 22.6 Hz] and I2=[6.6 Hz, 180.5 Hz].

Each elementary frequency component Si of each hypothetical spectrum SH is separated in frequency from at least one adjacent elementary frequency component Si of the hypothetical spectrum SH by a predetermined listing frequency difference DPe, preferably belonging to at least one of the ranges I1, I2.

In step 400, all the pairs of components Si of the spectrum S are listed and a frequency difference DFCk separating the components Si of each pair k from each other is determined.

In step 402, the pairs k for which the frequency difference DFCk belongs to one of the ranges I1, I2 are retained.

In step 404, each frequency difference DFCk of each pair k retained is classified in a family, called a frequency difference family, defined by a family frequency difference range $\sigma_F$. In the present case, all the ranges $\sigma_F$ are less than or equal to 0.5 Hz.

In step 406, out of the listed pairs of components, the pairs for which the frequency difference separating them belongs to the same family frequency difference range $\sigma_F$ are determined.

Then, in step 408, the hypothetical spectra SH as defined above are listed. A frequency characteristic of each hypothetical frequency spectrum SH is also determined; in this case the characteristic is the listing frequency difference DPe=$\sigma_F$ which separates, in frequency, each frequency component Si of the hypothetical spectrum SH from at least one adjacent frequency component Si of the hypothetical spectrum SH.

Then, in steps 410 to 414, frequency spectra SP1, SP2, called potential spectra, are selected from among the hypothetical spectra SH.

In step 410, for each listed hypothetical spectrum SH, a confidence index Ic, called the selection index, is determined, this index being associated with the selection of each hypothetical spectrum SH on the basis of at least one characteristic of at least one frequency component Si of each listed hypothetical spectrum SH. In this case, the index Ic is determined on the basis of a dispersion $D_E$ of the frequency difference between the elementary frequency components Si of the spectrum, a ratio R between the acoustic signal and the noise, the number $N_S$ of elementary frequency components in the spectrum and the density D of the spectrum, that is to say the ratio of the total number of elementary frequency components to the maximum number of possible elementary frequency components.

In step 412, a first potential spectrum SP1, capable of forming the spectrum SF1, SF2 of one of the first and second acoustic footprint noises BEA1, BEA2, is identified from among the hypothetical spectra SH having a frequency difference DPe belonging to the range I1. The first potential spectrum SP1 has a frequency difference DPp1 and an Ic index Ic1, which is the highest of the Ic indices of the listed spectra for which the frequency difference DPe belongs to the range I1. In step 414, the first potential spectrum SP1 is selected if the index Ic1 meets a predetermined condition relating to the selection of the first potential spectrum, in this case whether or not Ic1 is greater than or equal to a predetermined threshold.

Similarly, a second potential spectrum SP2, capable of forming the other frequency spectrum SF1, SF2 of one of the first and second acoustic footprint noises BEA1, BEA2, is identified from among the hypothetical spectra SH having a frequency difference DPe belonging to the range I2. The second potential spectrum SP2 has a frequency difference DPp2 and an Ic index Ic2, which is the highest of the Ic indices of the listed series for which the frequency difference DPe belongs to the range I2. The second potential spectrum SP2 is selected if the index Ic2 meets a predetermined condition relating to the selection of the second potential spectrum, in the present case whether or not Ic2 is greater than or equal to a predetermined threshold.

If each index Ic1, Ic2 is below the corresponding threshold, or if any one of the indices is below the corresponding threshold, a return is made to step 100.

Figure 9:
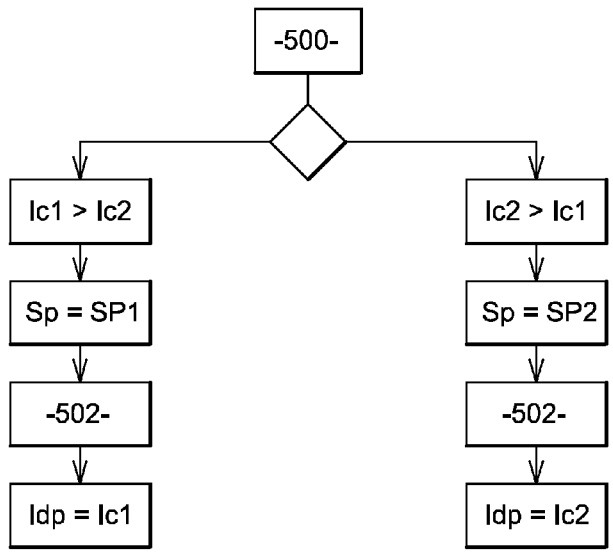
FIG. 9 is a flow diagram of steps for selecting a parent spectrum capable of forming the frequency spectrum of one of the first and second acoustic footprint noises on the basis of the first and second potential frequency spectra.

FIG. 9 shows a flow diagram illustrating steps for selecting a spectrum Sp, called the parent spectrum, capable of forming the frequency spectrum of one of the first and second acoustic footprint noises BEA1, BEA2.

In step 500, the parent spectrum Sp is selected from among the first and second potential spectra SP1, SP2. The parent spectrum Sp is the one for which the selection confidence index Ic is the greater of the indices Ic1, Ic2. In this embodiment, Ic2>Ic1. The second potential spectrum SP2 therefore forms the parent spectrum Sp. In this case, the parent spectrum Sp=SP2 has a frequency difference DPp=DPp2=77.5±1 Hz and an index Icp=Ic2. The parent spectrum Sp comprises the elementary frequency components Si shown in heavy lines in FIG. 7. In a variant, if Ic1>Ic2, the parent spectrum Sp=SP1 has a frequency difference DPp=DPp1=12.5±1 Hz and an index Icp=Ic1.

In step 502, if Ic2>Ic1, a confidence index Idp, called the detection confidence index, is determined, this index being associated with the detection of one of the acoustic footprint noises BEA1, BEA2 on the basis of a characteristic of the parent spectrum Sp, in this case SP2. In the present case, Idp=Icp. In a variant, Idp is calculated on the basis of characteristics other than $D_E$, R, $N_S$ and D. If Ic2<Ic1, a detection confidence index Idp is determined on the basis of a characteristic of the parent spectrum SP1.

Figure 10:
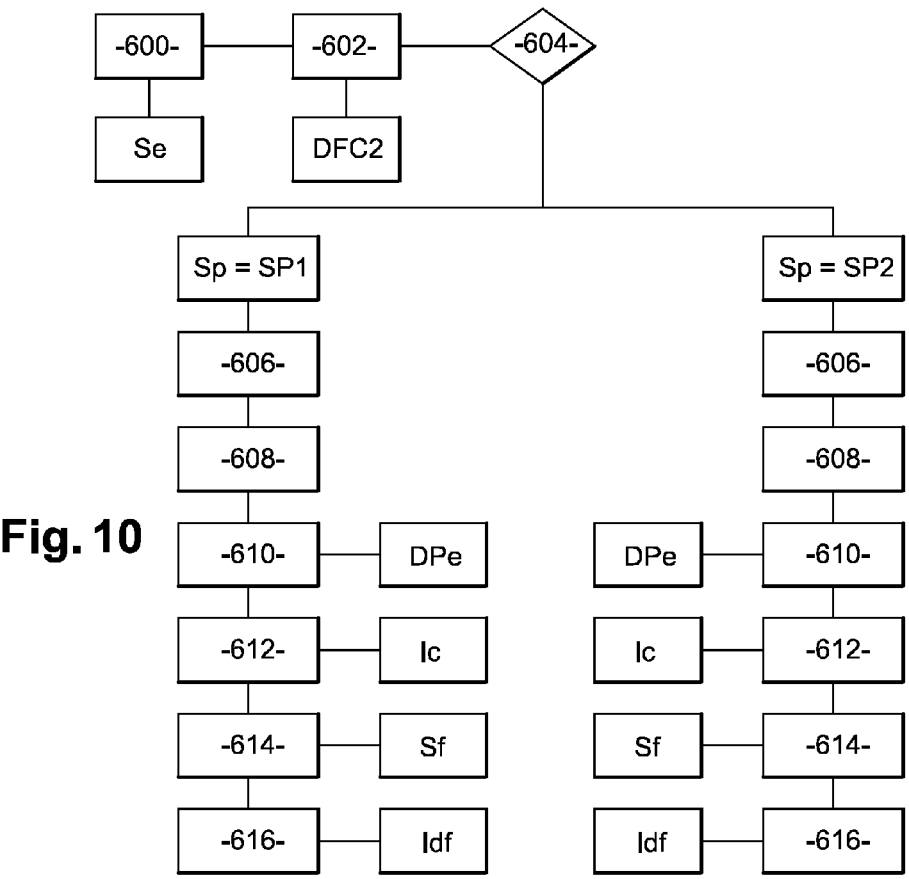
FIG. 10 is a flow diagram of steps for listing hypothetical frequency spectra and selecting a child spectrum capable of forming the other frequency spectrum of the first and second acoustic footprint noises.

FIG. 10 shows a flow diagram illustrating steps for selecting a spectrum Sf, called the child spectrum, capable of forming the frequency spectrum of the other of the first and second acoustic footprint noises BEA1, BEA2.

In step 600, at least a part of the parent spectrum Sp, in the present case at least some of the frequency components Si of the parent spectrum Sp, is eliminated from the spectrum S of the acoustic signal. In the present case, the elementary frequency components of the parent spectrum Sp having a spectral power density greater than or equal to a predetermined threshold are retained; that is to say, the elementary frequency components of the spectrum Sp having a spectral power density lower than the predetermined threshold are eliminated. This gives us a frequency spectrum Se from which certain components Si of the parent spectrum Sp have been trimmed.

In steps 602 to 612, hypothetical spectra SHf of elementary frequency components Si are listed on the basis of the spectrum Se, by following steps similar to steps 400 to 408. Each elementary frequency component Si of each hypothetical spectrum SHf is separated in frequency from at least one adjacent elementary frequency component Si of the hypothetical spectrum SHf by a listing frequency difference DPe determined on the basis of a frequency characteristic of the parent spectrum Sp, in this case the frequency difference DPp.

Thus, in step 602, all the pairs of components Si of the trimmed spectrum Se are listed and a frequency difference DFCk separating the components Si of each pair k from each other is determined.

In a step 604, if Sp=SP2=77.5 Hz, the pairs for which the frequency difference DFCk belongs to a range I3=[N1,min/N2,max*(DPp2−Ee), N1,max/N2,min*(DPp2+Ee)]=[⅛×76.5, ½×78.5]=[9.6, 39.3] are retained, where Ee is a frequency difference representing the estimated error in the value of the frequency difference DPp1 of the parent spectrum Sp; in this case, Ee=1 Hz. In the case where Sp=SP1=12.5 Hz, the pairs for which the frequency difference DFCk belongs to a range I3=[N2,min/N1,max*(DPp1−Ee), N2,max/N1,min*(DPp1+Ee)]=[2/1×11.5, 8/1×13.5]= [23 Hz, 108 Hz] are retained.

Thus the selection of the child frequency spectrum Sf is limited to the hypothetical spectra SHf whose frequency difference DFCk lies within a range of frequency differences I3 determined on the basis of the frequency difference DPp1 of the parent spectrum Sp.

In step 606, each frequency difference DFCk of each pair of components Si is classified in a family, called a frequency difference family, defined by a family frequency difference range $\sigma_F$. In the present case, all the ranges $\sigma_F$ are less than or equal to 0.5 Hz.

In step 608, out of the listed pairs of components, the pairs for which the frequency difference separating them belongs to the same family frequency difference range $\sigma_F$ are determined.

Then, in step 610, the spectra SHf as defined above are listed. A frequency characteristic of each hypothetical frequency spectrum SHf is also determined; in the present case, the characteristic is the listing frequency difference DPe=$\sigma_F$ which separates, in frequency, each frequency component Si of the hypothetical spectrum SHf from at least one adjacent frequency component Si of the hypothetical spectrum SHf.

Then, in step 612, for each listed hypothetical spectrum SHf, a selection confidence index Ic is determined, this index being associated with the selection of each hypothetical spectrum SHf on the basis of at least one characteristic of at least one frequency component Si of each listed hypothetical spectrum SHf. The index Ic is determined in a similar way to the index Ic calculated in step 410.

Then, in step 614, the child spectrum Sf is selected from among the spectra SHf. The child spectrum Sf has the highest index Ic=Id of the Ic indices of the listed spectra. The child spectrum Sf comprises the elementary frequency components Si shown in fine lines in FIG. 7.

In step 616, a confidence index Idf, called the detection confidence index, is determined, this index being associated with the detection of the other acoustic footprint noise BEA1, BEA2 on the basis of a characteristic of the child spectrum Sf. The index Idf is calculated in a similar way to the index Idp.

Finally, in a decision-making step, if each detection confidence index Idp, Idf meets a predetermined condition relating to the detection of each acoustic footprint noise BEA1, BEA2, a warning of the detection of wear of the tyre 10 is emitted. In the present case, the conditions relating to the detection of the acoustic footprint noise BEA1 and BEA2 are identical. Each index Idp, Idf meets the predetermined condition if each index Idp, Idf is greater than or equal to a predetermined threshold. If each of the detection confidence indices Idp, Idf, or only one of the indices Idp, Idf, fails to meet the corresponding predetermined condition, no warning of the detection of the wear of the tyre 10 is emitted, and a return is made to step 100.

The invention is not limited to the embodiment described above.

In fact, the method according to the invention may also be used if all or some of the parameters of the tyre determining the frequency differences DPT1, DPT2 are known. Thus, if the number $N_{TUS}$ of indicators 17 is known, notably because all the tyres having this type of indicator 17 have an identical number of them, and if the circumference C of the tyre 10 and the speed V of the tyre 10 are known, for example on the basis of a GPS (Global Positioning System), the ranges I1, I2 and I3 are reduced, and the robustness of the detection is improved. The uniqueness and ease of detection of the Dirac combs therefore increases with an increase in the accuracy of the knowledge of the tyre parameters.

All or some of the method according to the invention may be applied by means of coded instructions adapted to command the execution of the steps of the method when run on a computer. The instructions may be obtained from computer programs recorded on a data recording medium, for example a medium of the hard disc, flash memory, CD or DVD type. Provision may be made to make a program of this type available for downloading on a telecommunications network such as the Internet or a wireless network. Updates of the program can thus be sent via this network to the computers connected to the network.

In the course of the detection method, the time-dependent acoustic signal is detected by an acoustic sensor on board the vehicle, and data relating to the acoustic signal are transmitted towards a remote server not located on board the motor vehicle. The method comprises, before the transmission step, pre-processing of the acoustic signal carried out on board the vehicle.

In one embodiment, the pre-processing comprises step 100 and the subsequent steps are executed on the remote server. Thus a device required to have high performance does not have to be provided on the vehicle. Furthermore, updates of the method may be carried out directly on the server.

In another embodiment, the pre-processing comprises steps 100 and 102, and the subsequent steps are executed on the remote server.

In yet another embodiment, the pre-processing comprises steps 100 to 108, and the subsequent steps are executed on the remote server. Thus the volume of data transmitted from the vehicle is reduced.

These characteristics relating to the pre-processing step may be used independently of the steps in which:

an acoustic signal capable of comprising the first and second acoustic footprint noises is acquired, within the frequency spectrum of the acquired acoustic signal, a frequency spectrum, called the parent spectrum, is selected, this spectrum being capable of forming the frequency spectrum of one of the first and second acoustic footprint noises, a frequency spectrum called a trimmed spectrum is determined by eliminating at least part of the parent spectrum from the spectrum of the acoustic signal, within the trimmed spectrum, a frequency spectrum, called the child spectrum, is selected, this spectrum being capable of forming the frequency spectrum of the other of the first and second acoustic footprint noises, two confidence indices, called detection confidence indices, are determined, these indices being associated with the detection of the first and second acoustic footprint noises based on at least one characteristic of each selected parent and child spectrum, if each detection confidence index meets a predetermined condition relating to the detection of each first and second acoustic footprint noise, a warning of the detection of tyre wear is emitted.

The invention claimed is:

1. A method for detecting a wear condition of a tyre that includes a first tread pattern element adapted to generate a first acoustic footprint noise and a second tread pattern element adapted to generate a second acoustic footprint noise, the first and second acoustic footprint noises being characteristic of the wear condition of the tyre, the method comprising steps of:
   acquiring an acoustic signal that is capable of including the first and second acoustic footprint noises;
   selecting a parent frequency spectrum, which is capable of forming a frequency spectrum of one of the first and second acoustic footprint noises, from within a frequency spectrum of the acquired acoustic signal;
   determining a trimmed frequency spectrum by eliminating at least part of the parent frequency spectrum from the frequency spectrum of the acquired acoustic signal;
   selecting a child frequency spectrum, which is capable of forming a frequency spectrum of another of the first and second acoustic footprint noises, from within the trimmed frequency spectrum;
   determining two detection confidence indices, which are indices associated with detection of the first and second acoustic footprint noises, based on at least one characteristic of each of the parent frequency spectrum and the child frequency spectrum; and
   if each of the two detection confidence indices meets a predetermined condition relating to detection of each of the first and second acoustic footprint noises, a warning is emitted indicating detection of wear of the tyre.

2. The method according to claim 1,
   wherein the parent frequency spectrum includes elementary frequency components, and
   wherein the method further comprises a step of retaining components of the elementary frequency components of the parent frequency spectrum having a spectral power density above a predetermined threshold.

3. The method according to claim 1, further comprising steps of:
   listing at least one hypothetical frequency spectrum; and
   determining at least one frequency characteristic of each hypothetical frequency spectrum.

4. The method according to claim 3, further comprising a step of, for each hypothetical frequency spectrum, determining a confidence or selection index, the confidence or selection index being associated with a selection of the hypothetical frequency spectrum.

5. The method according to claim 3,
   wherein each hypothetical frequency spectrum includes elementary frequency components, and
   wherein, for each hypothetical frequency spectrum, a frequency characteristic of the hypothetical frequency spectrum is a frequency difference separating each elementary frequency component, in frequency, from at least one adjacent elementary frequency component of the hypothetical spectrum.

6. The method according to claim 4,
   wherein each hypothetical frequency spectrum includes elementary frequency components, and
   wherein, for each hypothetical frequency spectrum, a frequency characteristic of the hypothetical frequency spectrum is a frequency difference separating each elementary frequency component, in frequency, from at least one adjacent elementary frequency component of the hypothetical spectrum.

7. The method according to claim 5, wherein the step of selecting the child frequency spectrum is limited to selecting from hypothetical frequency spectra whose frequency difference lies within a range of frequency differences determined based on a frequency difference of the parent frequency spectrum.

8. The method according to claim 6, wherein the step of selecting the child frequency spectrum is limited to selecting from hypothetical frequency spectra whose frequency difference lies within a range of frequency differences determined based on a frequency difference of the parent frequency spectrum.

9. The method according to claim 1, further comprising a step of selecting first and second potential frequency spectra within the frequency spectrum of the acquired acoustic signal, wherein each of the first and second potential frequency spectra is capable of forming a frequency spectrum of one of the first and second acoustic footprint noises, and wherein the parent frequency spectrum is selected from amongst the first and second potential frequency spectra.

10. The method according to claim 9, further comprising steps of:
    listing at least one hypothetical frequency spectrum; and
    determining at least one frequency characteristic of each hypothetical frequency spectrum,
    wherein each hypothetical frequency spectrum includes elementary frequency components,
    wherein, for each hypothetical frequency spectrum, a frequency characteristic of the hypothetical frequency spectrum is a frequency difference separating each elementary frequency component, in frequency, from at least one adjacent elementary frequency component of the hypothetical spectrum, and
    wherein the first and second potential frequency spectra are selected from amongst hypothetical spectra having a frequency difference belonging, respectively, to first and second ranges of predetermined frequency differences.

11. A computer programmed with code that, when executed, performs method for detecting a wear condition of a tyre that includes a first tread pattern element adapted to generate a first acoustic footprint noise and a second tread pattern element adapted to generate a second acoustic footprint noise, the first and second acoustic footprint noises being characteristic of the wear condition of the tyre, the method comprising steps of:
    acquiring an acoustic signal that is capable of including the first and second acoustic footprint noises;
    selecting a parent frequency spectrum, which is capable of forming a frequency spectrum of one of the first and second acoustic footprint noises, from within a frequency spectrum of the acquired acoustic signal;
    determining a trimmed frequency spectrum by eliminating at least part of the parent frequency spectrum from the frequency spectrum of the acquired acoustic signal;
    selecting a child frequency spectrum, which is capable of forming a frequency spectrum of another of the first and second acoustic footprint noises, from within the trimmed frequency spectrum;
    determining two detection confidence indices, which are indices associated with detection of the first and second acoustic footprint noises, based on at least one characteristic of each of the parent frequency spectrum and the child frequency spectrum; and if each of the two detection confidence indices meets a predetermined condition relating to detection of each of the first and second acoustic footprint noises, a warning is emitted indicating detection of wear of the tyre.

12. A non-transitory computer-readable storage medium storing code that, when executed by a computer, causes the computer to perform a method for detecting a wear condition of a tyre that includes a first tread pattern element adapted to generate a first acoustic footprint noise and a second tread pattern element adapted to generate a second acoustic footprint noise, the first and second acoustic footprint noises being characteristic of the wear condition of the tyre, the method comprising steps of:
  acquiring an acoustic signal that is capable of including the first and second acoustic footprint noises;
  selecting a parent frequency spectrum, which is capable of forming a frequency spectrum of one of the first and second acoustic footprint noises, from within a frequency spectrum of the acquired acoustic signal;
  determining a trimmed frequency spectrum by eliminating at least part of the parent frequency spectrum from the frequency spectrum of the acquired acoustic signal;
  selecting a child frequency spectrum, which is capable of forming a frequency spectrum of another of the first and second acoustic footprint noises, from within the trimmed frequency spectrum;
  determining two detection confidence indices, which are indices associated with detection of the first and second acoustic footprint noises, based on at least one characteristic of each of the parent frequency spectrum and the child frequency spectrum; and
  if each of the two detection confidence indices meets a predetermined condition relating to detection of each of the first and second acoustic footprint noises, a warning is emitted indicating detection of wear of the tyre.

13. A process for detecting tyre wear, the processing comprising steps of:
  storing, on a non-transitory computer-readable storage medium, code that when executed by a computer causes the computer to perform a method for detecting a wear condition of a tyre that includes a first tread pattern element adapted to generate a first acoustic footprint noise and a second tread pattern element adapted to generate a second acoustic footprint noise, the first and second acoustic footprint noises being characteristic of the wear condition of the tyre, the method including:
  acquiring an acoustic signal that is capable of including the first and second acoustic footprint noises;
  selecting a parent frequency spectrum, which is capable of forming a frequency spectrum of one of the first and second acoustic footprint noises, from within a frequency spectrum of the acquired acoustic signal;
  determining a trimmed frequency spectrum by eliminating at least part of the parent frequency spectrum from the frequency spectrum of the acquired acoustic signal;
  selecting a child frequency spectrum, which is capable of forming a frequency spectrum of another of the first and second acoustic footprint noises, from within the trimmed frequency spectrum;
  determining two detection confidence indices, which are indices associated with detection of the first and second acoustic footprint noises, based on at least one characteristic of each of the parent frequency spectrum and the child frequency spectrum; and
  if each of the two detection confidence indices meets a predetermined condition relating to detection of each of the first and second acoustic footprint noises, a warning is emitted indicating detection of wear of the tyre; and
  enabling the code to be downloaded via a telecommunications network.

* * * * *